No. 781,039. Patented January 31, 1905.

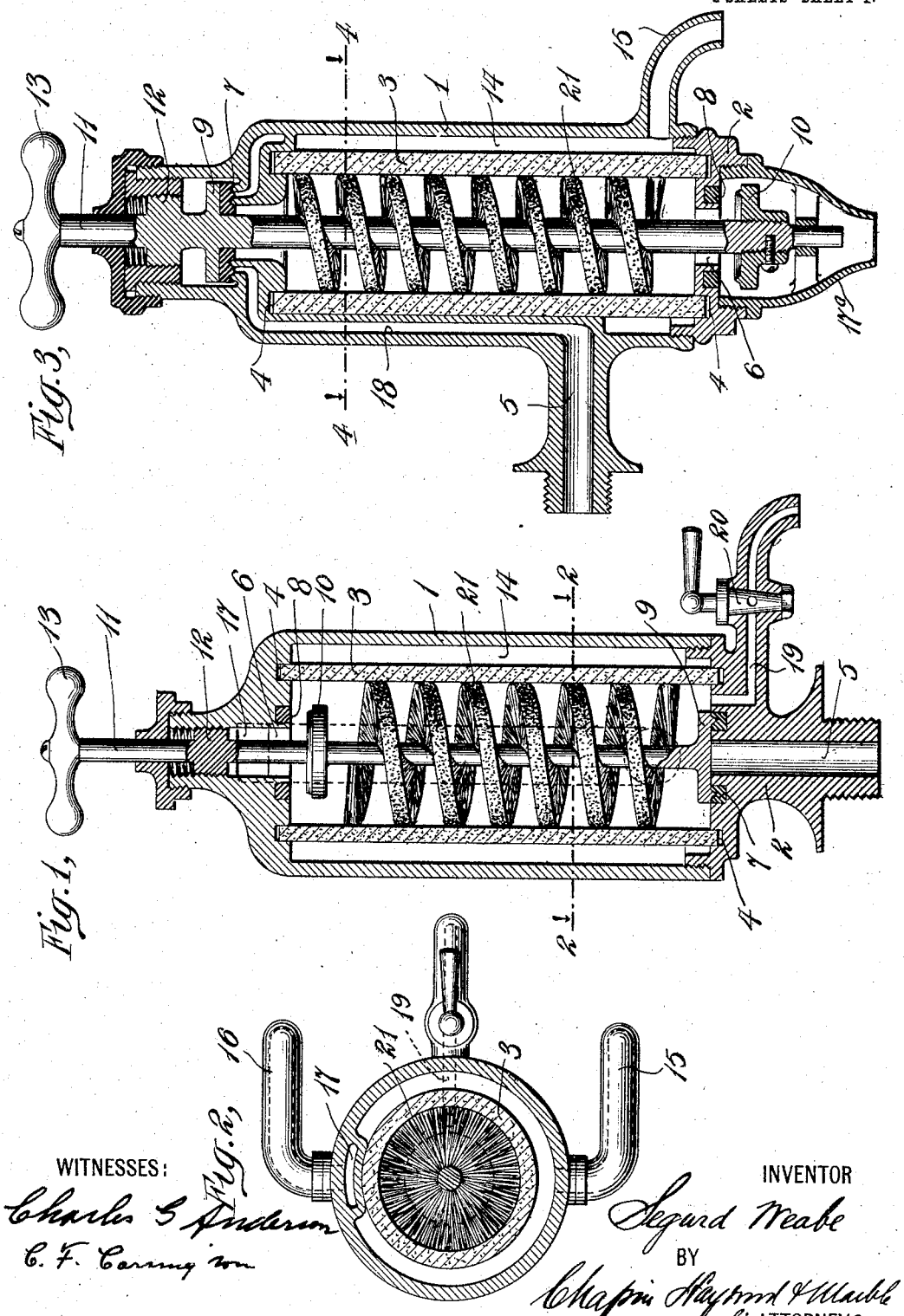

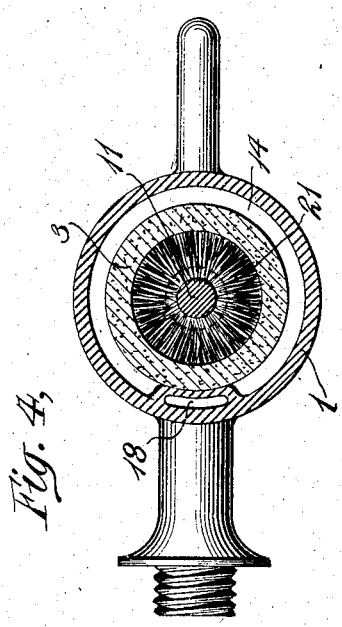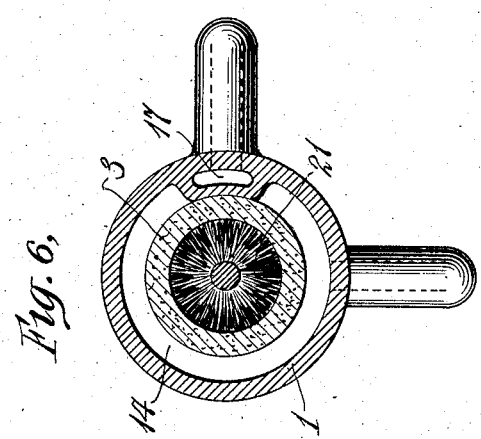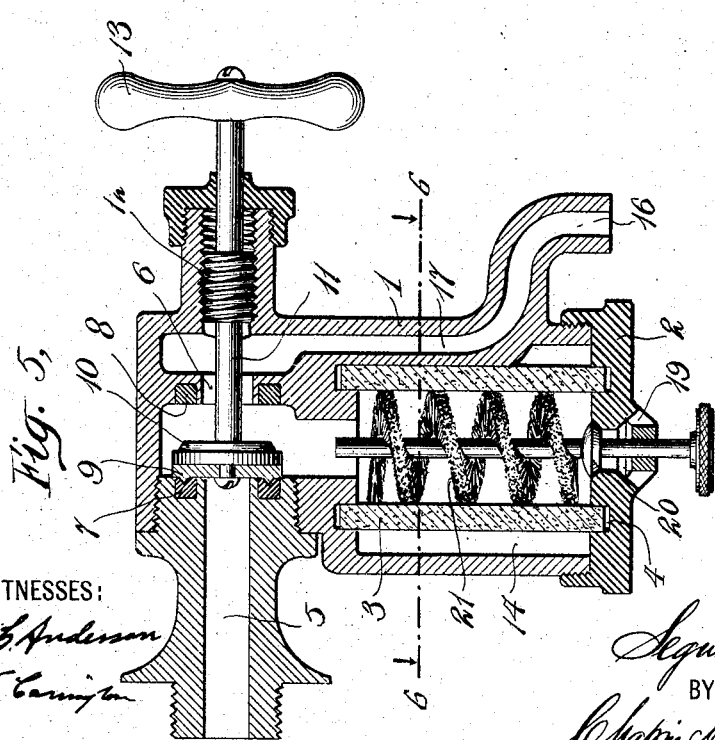

UNITED STATES PATENT OFFICE.

SEGURD WEABE, OF NEW YORK, N. Y., ASSIGNOR OF ONE-HALF TO CHARLES GUSTAF ANDERSON, OF NEW YORK, N. Y.

FILTER OR STRAINER.

SPECIFICATION forming part of Letters Patent No. 781,039, dated January 31, 1905.

Application filed March 7, 1904. Serial No. 196,872.

*To all whom it may concern:*

Be it known that I, SEGURD WEABE, a subject of the King of Sweden and Norway, and a resident of New York city, in the county and State of New York, have invented certain new and useful Improvements in Filters or Strainers, reference being had to the accompanying drawings, forming a part thereof.

My invention relates to filters in which means are provided for delivering filtered or unfiltered water at will; and the object of my invention is to simplify filters of this character, to control the delivery of filtered or unfiltered water by a single operating-stem and by the use of simple disk-valves, and to render the parts readily accessible and easy of manufacture.

To these ends my invention consists in certain novel details of construction and combination of parts, as will hereinafter be pointed out.

My invention also consists in certain improved means for cleansing the filtering material, which means may be operated from the exterior of the casing while the casing is kept closed.

I will now proceed to describe apparatus embodying my invention, and will then point out the novel features in claims.

In the drawings, Figure 1 is a view in central vertical section of a filter embodying my invention. Fig. 2 is a view in horizontal transverse section of the same. Fig. 3 is a view in central vertical section of another form of my filter. Fig. 4 is a view in horizontal transverse section thereof. Fig. 5 is a view in central vertical section of a further modification of my invention. Fig. 6 is a view in horizontal transverse section thereof.

In all three forms of my invention illustrated herein a casing is provided comprising a substantially cylindrical portion 1, inclosing a filtering-chamber, and a cap or head 2, fitted to the lower end thereof. A cylinder 3, of filtering material, is supported within the filtering-chamber, being fitted to annular grooves 4 4 in the cylindrical portion of the casing and in the cap or head.

The casing is provided in each instance with an inlet 5, arranged to be connected to a source of supply, and a discharge-passage 6. The said inlet and discharge passages are provided at about the point at which they communicate with the filtering-chamber with oppositely-disposed valve-seats 7 and 8, and oppositely-disposed valves 9 and 10, secured to a single operating-stem 11, are fitted to the said valve-seats and are arranged when operated to open or close passage of fluid through the said valve-seats. The distance between the valve-faces bears such relation to the distance between the valve-seats that when one of the valves is closed the other must be open; but in an intermediate position both valves will be open. The valve-stem is provided with a screw-threaded portion 12, fitted to a correspondingly-screw-threaded portion in the casing, and with a handpiece 13, by which it may be rotated. The outside diameter of the cylinder of filtering material 3 employed being smaller than the inside diameter of the cylindrical portion of the casing, an annular chamber 14 is formed, into which filtered water is received. A discharge-nozzle 15 connects with this chamber 14 and delivers the filtered water so received.

In the construction shown in Figs. 1 and 2 the discharge-nozzle 15 projects from one side of the cylindrical portion of the casing, and a similar discharge-nozzle 16, projecting from the other side of the casing, connects through a passage 17 with the discharge-passage 6 and is thus arranged to deliver unfiltered water.

When the valves are in the position shown in the drawings, inlet is closed and water is prevented from entering or passing through the device. When the stem 11 is operated to open the inlet-valve 9 and close the discharge-valve 10, water will be admitted to the interior of the filtering-chamber and, passage past the valve 10 being denied, will force its way through the filtering material 3 to the chamber 14 and thence to the delivery-nozzle 15. If, however, the stem 11 is operated to an intermediate position in which both valves 9 and 10 would be open, water will flow from inlet 5 direct to discharge 6 and thence to unfiltered-water delivery, such being a path of less resistance than the path through the filtering material. In the construction of Figs. 1 and 5 the discharge 6 leads directly through passage 17 to delivery-nozzle 16, while in the construction of Fig. 3 a nozzle 17ª connects with the base of the filter-chamber and acts as an unfiltered-water delivery. In this form of the device the inlet 5 connects with the valve-seat 7 through a passage 18 instead of direct, as in the forms shown in Figs. 1 and 5.

In the form of apparatus shown in Fig. 3 the interior of the filter-chamber is kept clear of sediment by the discharge through the bottom thereof. In the forms shown in Figs. 1 and 5 a special passage 19 is provided for this purpose and a valve 20 controls said passage. The valve 20 is only intended to be opened when it is desired to wash out the filter; otherwise it will be kept closed and the valves operated by the stem 11 will only be used.

In order to clean the surface of the cylinder of filtering material without removing same and without opening up the device, I have provided a cylindrical brush 21, arranged within the filter-chamber and with its periphery in contact with the inner surface of the filtering-cylinder, whereby upon rotation of the said brush the inner surface of the filtering-cylinder will be brushed or scraped. Residue thus scraped or brushed off may be washed away in a washing operation, as above described. The brush may be operated by any suitable means extending through to the exterior of the casing. In Figs. 1 and 3 I have shown the brush as carried by the valve-stem 11, while in Fig. 5 I have shown it as carried by the stem of the valve 20.

What I claim is—

1. In a filter, the combination with a casing having an inlet-passage and two discharge-passages, of a valve for said inlet-passage, another oppositely-disposed valve for one of said discharge-passages, and a single operating-stem for both said valves, said casing having means for supporting filtering material in a position across the other of said discharge-passages, whereby water may pass through the former said discharge-passage without passing through the filtering material, while water passing through the latter said discharge-passage is compelled to pass through the said filtering material.

2. In a filter, the combination with a casing having an inlet-passage and two discharge-passages, said casing having means for supporting material in a position across one of said discharge-passages, said inlet and the other of said discharge-passages provided with oppositely-disposed valve-seats, of a longitudinally-movable valve-stem, two oppositely-disposed valves secured thereto, the distance between the faces of the two said valves, and the two said valve-seats, being greater, the one than the other, and means for moving the said stem longitudinally to cause the valves to engage and disengage their respective seats.

3. In a filter the combination with a casing having means for supporting and retaining a cylinder of filtering material, said casing provided with an inlet leading to a point located within said filtering-cylinder when in place and a discharge-passage leading therefrom, and having also a discharge-passage leading from a point located without said filtering-cylinder, when in place, said inlet-passage and said first-named discharge-passage provided with valve-seats, of valves fitted to said valve-seats, and a single operating-stem for said valves, substantially as set forth.

4. In a filter the combination with a casing inclosing a filtering-chamber, and having an inlet to said filtering-chamber, a discharge therefrom leading from the inlet side of said filtering-chamber and a discharge leading from the discharge side of said filtering-chamber, of valves fitted to said inlet and said first-mentioned discharge, and an operating-stem for said valves, said casing having also a discharge-passage leading from the bottom of said filtering-chamber, and an independent valve and operating means therefor.

5. In a filter, the combination with a casing having means for supporting and retaining a hollow cylinder of filtering material, said casing provided with an inlet leading to within said filtering-cylinder when in place, at one end thereof, and a discharge-passage leading from within said cylinder when in place at the opposite end thereof, and having also a discharge-passage leading from a point located without said filtering-cylinder, when in place, said inlet-passage and said first-named discharge-passage provided with valve-seats, of valves fitted to said valve-seats, and a single operating-stem for said valves, substantially as set forth.

6. In a filter, the combination with a casing, of a hollow cylinder of filtering material supported thereby, said casing provided with oppositely-disposed valve-seats opening to the interior of said filtering-cylinder, an inlet-passage leading to one of said valve-seats and a discharge-passage leading from the other, of oppositely-disposed valves for said valve-seats, and a single operating-stem for both said valves, said casing having also another discharge-passage leading from a point exterior said filtering-cylinder, whereby water discharged therethrough must pass through the walls of said filtering-cylinder, from the interior to the exterior thereof.

7. In a filter, the combination with a cylindrical casing, having means thereon for supporting a cylindrical core of filtering material, the outer diameter of which is smaller than the inner diameter of said casing, whereby a substantially annular chamber is formed between said casing and said filtering-core, said casing provided with oppositely-disposed valve-seats opening to the interior of said filtering-core when in place, and admission and discharge passages leading thereto and therefrom respectively, of oppositely - disposed valves fitted to said valve-seats, and a single operating-stem for both said valves, said casing also provided with another discharge-passage leading through the casing-wall, from said annular chamber.

8. In a filter, the combination with a cylindrical casing, having means thereon for supporting a cylindrical core of filtering material, the outer diameter of which is smaller than the inner diameter of said casing, whereby a substantially annular chamber is formed between said casing and said filtering-core, said casing provided with oppositely-disposed valve-seats opening to the interior of said filtering-core when in place, and admission and discharge passages leading thereto and therefrom respectively, of oppositely - disposed valves fitted to said valve-seats, and a single operating-stem for both said valves, said casing also provided with another discharge-passage leading through the casing-wall, from said annular chamber, a portion of said annular chamber inclosed and divided off to constitute one of the first-said passages.

SEGURD WEABE.

Witnesses:
CHARLES G. ANDERSON,
D. HOWARD HAYWOOD.